(12) United States Patent
Tan et al.

(10) Patent No.: US 12,452,348 B2
(45) Date of Patent: Oct. 21, 2025

(54) PACKET MODIFICATION METHOD AND APPARATUS, COMPUTER DEVICE, AND STORAGE MEDIUM

(71) Applicant: SANECHIPS TECHNOLOGY CO., LTD, Guangdong (CN)

(72) Inventors: Tonglei Tan, Guangdong (CN); Feng Zhou, Guangdong (CN); Jinlin Xu, Guangdong (CN); Hengqi Liu, Guangdong (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 469 days.

(21) Appl. No.: 18/026,864

(22) PCT Filed: Sep. 17, 2021

(86) PCT No.: PCT/CN2021/119015
§ 371 (c)(1),
(2) Date: Mar. 17, 2023

(87) PCT Pub. No.: WO2022/057887
PCT Pub. Date: Mar. 24, 2022

(65) Prior Publication Data
US 2023/0336643 A1 Oct. 19, 2023

(30) Foreign Application Priority Data
Sep. 17, 2020 (CN) .......................... 202010980734.6

(51) Int. Cl.
*H04L 69/22* (2022.01)
*G06F 9/22* (2006.01)
*G06F 9/30* (2018.01)

(52) U.S. Cl.
CPC .............. *H04L 69/22* (2013.01); *G06F 9/226* (2013.01); *G06F 9/30014* (2013.01); *G06F 9/30043* (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 2006/0164980 A1* | 7/2006 | Guru | H04L 63/101 370/389 |
| 2020/0259765 A1* | 8/2020 | Bosshart | H04L 45/7453 |
| 2022/0303046 A1* | 9/2022 | Mishra | H04L 45/745 |

* cited by examiner

*Primary Examiner* — Robert M Morlan
(74) *Attorney, Agent, or Firm* — Li & Cai Intellectual Property (USA) Office (57) ABSTRACT

The present disclosure provides a packet modification method and apparatus, a computer device, and a storage medium. The method includes: dividing a field to be modified that is related to packet encapsulation information into M containers; performing instruction extraction on a very long instruction word executing a modification command, to obtain N groups of initial instructions, where $2 \leq N \leq M$; processing the N groups of initial instructions to obtain N groups of source operands and N groups of modification field configuration information; determining, according to the N groups of modification field configuration information, N containers matched with the N groups of source operands, respectively; and modifying, according to the N groups of source operands, the N matched containers, respectively.

17 Claims, 4 Drawing Sheets

PACKET MODIFICATION METHOD AND APPARATUS, COMPUTER DEVICE, AND STORAGE MEDIUM

CROSS-REFERENCING OF RELATED APPLICATIONS

The present disclosure claims priority from Chinese patent application No. 202010980734.6 titled "PACKET MODIFICATION METHOD AND APPARATUS, COMPUTER DEVICE, AND STORAGE MEDIUM" filed with the China National Intellectual Property Administration on Sep. 17, 2020, the entirety of which is incorporated herein by reference.

TECHNICAL FIELD

The present disclosure relates to, but is not limited to, the fields of Ethernet forwarding and transmission communication, and specifically relates to a packet modification method, a packet modification apparatus, a computer device, and a computer-readable storage medium.

BACKGROUND

The essence of the communication network resides in data exchange, and the software defined network (SDN) proposes a three-layer architecture, including an application layer, a control layer, and a forwarding layer. The SDN is programmable. The Openflow protocol (a protocol using an application program interface process or the like to configure network switches) runs between the control layer and the forwarding layer. In an Ethernet forwarding switching system under an Openflow architecture, a next-hop forwarding path of a packet is decided by an SDN controller and a flow table, and packet encapsulation information is updated through instructions of a micro-engine to implement packet switching between different network devices.

The micro-engine design under the Openflow architecture typically adopts a very long instruction word (VLIW) to enable a single instruction word index to trigger execution of multiple instruction units. The VLIW is a very long combination of instructions that concatenates many instructions together, thereby increasing the speed of operation. When the packet encapsulation information is updated, the instructions are generally executed in serial, and a serial execution cycle of the instructions is increased in an accelerated manner along with a total number of instructions in the very long instruction word. The term "serial execution" used herein means that one microcode instruction can modify merely a certain segment of consecutive content of a field related to the packet encapsulation information, and a plurality of microcode instructions are desired to modify fields at different positions. The microcode instruction refers to a technique using software to implement a hardware design, which typically resides in a high-speed memory and translates a machine instruction into a detailed sequence of circuit operations.

How to modify a field related to the packet encapsulation information is an urgent technical problem to be solved in the field.

SUMMARY

In a first aspect, an embodiment of the present disclosure provides a packet modification method, including: dividing a field to be modified that is related to packet encapsulation information into M containers: performing instruction extraction on a very long instruction word executing a modification command, to obtain N groups of initial instructions, where $2 \leq N \leq M$: processing the N groups of initial instructions to obtain N groups of source operands and N groups of modification field configuration information; determining, according to the N groups of modification field configuration information, N containers matched with the N groups of source operands, respectively; and modifying, according to the N groups of source operands, the N matched containers, respectively.

In a second aspect, an embodiment of the present disclosure further provides a packet modification apparatus, including: a dividing module configured to divide a field to be modified that is related to packet encapsulation information into M containers: an extraction module configured to perform instruction extraction on a very long instruction word executing a modification command, to obtain N groups of initial instructions, where $2 \leq N \leq M$: a processing module configured to process the N groups of initial instructions to obtain N groups of source operands and N groups of modification field configuration information: a determining module configured to determine, according to the N groups of modification field configuration information, N containers matched with the N groups of source operands, respectively; and a modification module configured to modifying, according to the N groups of source operands, the N matched containers, respectively.

In a third aspect, an embodiment of the present disclosure further provides a computer device, including: one or more processors; and a storage means having one or more programs stored thereon which, when executed by the one or more processors, cause the one or more processors to perform the packet modification method as described above.

In a fourth aspect, an embodiment of the present disclosure further provides a computer readable storage medium having a computer program stored thereon which, when executed, causes the packet modification method as described above to be implemented.

DETAIL DESCRIPTION OF EMBODIMENTS

In order to make those skilled in the art better understand the technical solutions of the present disclosure, the packet modification method, the packet modification apparatus, the computer device, and the computer-readable storage medium of the present disclosure will be described hereinafter in detail with reference to the accompanying drawings.

Example embodiments will be described more sufficiently below with reference to the accompanying drawings, but which may be embodied in different forms and should not be construed as limited to the embodiments set forth herein. Rather, these embodiments are provided so that the present disclosure will be thorough and complete, and will fully convey the scope of the present disclosure to those skilled in the art.

Embodiments of the present disclosure and features thereof may be combined with each other without conflict. As used herein, the term "and/or" includes any and all combinations of one or more of the associated listed items.

The terminology used herein is for the purpose of describing specific embodiments merely and is not intended to limit the present disclosure. As used herein, the singular forms "a", "an" and "the" are intended to include the plural forms as well, unless the context clearly indicates otherwise. It will be further understood that as used herein, the terms "comprise" and/or "consist of . . . " specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the related art and the present disclosure, and will not be interpreted in an idealized or overly formal sense unless expressly so defined herein.

Currently, common scenarios for modifying a field related to the packet encapsulation information include modification of hard-forwarding fixed packet content. In the packet modification design of a hard-forwarding chip, the packet is parsed first based on a service flow direction of the forwarding chip, then layer 2 medium/media access control (MAC, an identifier that identifies each site on the Internet) service processing, or multi-protocol label switching (MPLS) label service processing, or Internet protocol (IP, a protocol for interconnection between networks) routing service processing is performed, and finally, the packet is encapsulated. The modification of the field related to the packet encapsulation information is completed along the routing during service processing, and after services of all the modules are processed, complete modification of the field related to the packet encapsulation information is completed once.

In the programmable instruction modification technology, the programmable architecture is further classified into a parallel run to completion (RTC) structure or a serial flow table structure. The serial flow table structure adopts the instruction mode of a very long instruction word. In the case where the programmable architecture adopts the very long instruction word, a modification function of the field related to the packet encapsulation information may be performed by a plurality of instruction units of a very long instruction word specified by software. Each instruction unit executes an instruction, and consecutive fields of the field related to the packet encapsulation information may be modified during execution of the instruction. If one cycle is required for each instruction to be executed, a plurality of cycles are desired for completing serial execution of a very long instruction word.

In order to solve the above problem, embodiments of the present disclosure provide a packet modification method, a packet modification apparatus, a computer device, and a computer-readable storage medium.

Figure 1:
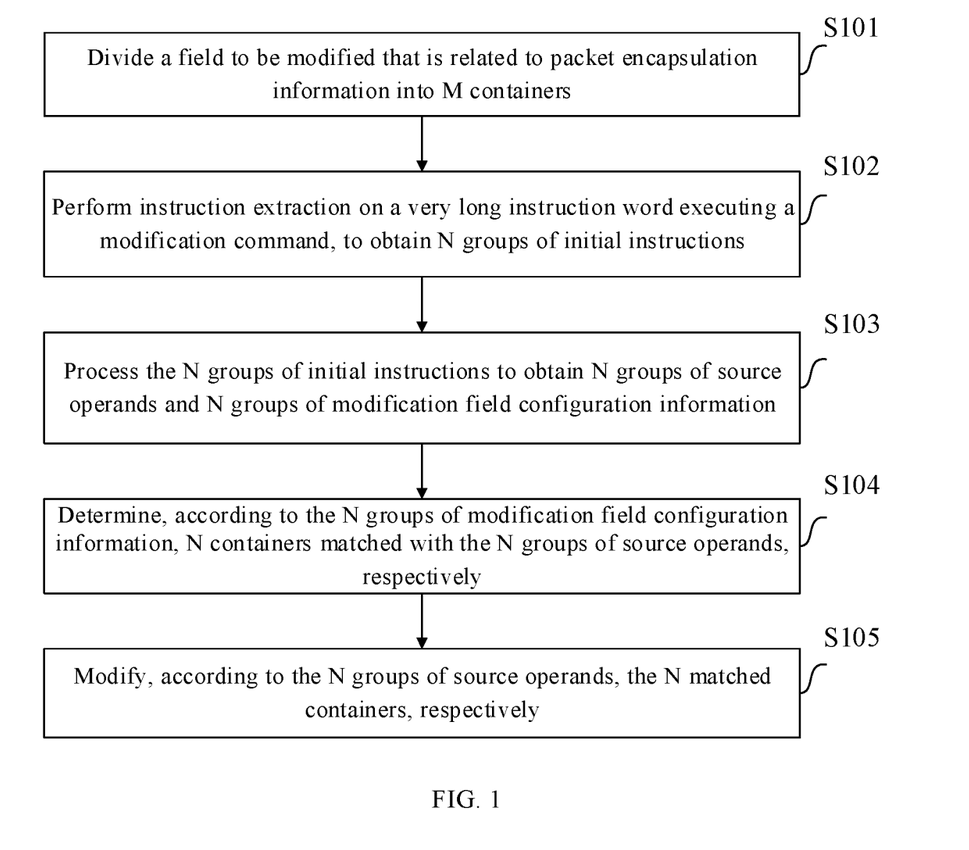
FIG. 1 is a flowchart of a packet modification method according to an embodiment of the present disclosure.

FIG. 1 shows a flowchart of a packet modification method according to an embodiment of the present disclosure. The packet modification method may be applied to a packet modification apparatus. As shown in FIG. 1, the packet modification method according to the embodiment includes the following operations S101 to S105.

At operation S101, dividing a field to be modified that is related to packet encapsulation information into M containers.

In this operation, the packet modification apparatus divides a field to be modified that is related to packet encapsulation information into M containers which are arranged in sequence with corresponding container numbers, i.e., containers 1 to M.

The field to be modified includes consecutive fields and is configured to modify packet encapsulation information of a next hop of the packet.

It should be noted that the containers support to modify any one of the following maximum numbers of bits: 8 bits, 16 bits, or 32 bits. The divided containers are respectively 4-byte containers, 2-byte containers, and 1-byte containers, and support to modify a maximum number of 32 bits, 16 bits and 8 bits, respectively.

At operation S102, performing instruction extraction on a very long instruction word executing a modification command, to obtain N groups of initial instructions.

In this operation, the packet modification apparatus performs instruction extraction on a very long instruction word executing a modification command, that is, analyzes and computes the very long instruction word to obtain a new extracted instruction word, including N groups of initial instructions. In this embodiment, $2 \leq N \leq M$, and N is less than or equal to the number of containers, so as to ensure that all the instructions are used to modify the containers divided from the field to be modified. In the existing art, multiple cycles are desired to execute the very long instruction word. However, in the embodiment of the present disclosure, the N groups of initial instructions can be executed within one cycle.

In some implementations, the instructions of the very long instruction word that modify the field to be modified are mutually crossed and indirectly addressed. In other words, a valid address of an operand is stored in a register, the address of the operand is obtained from the register, and an address of the register is contained in the instructions. In an embodiment of the present disclosure, the N groups of initial instructions are directly addressed without crossing. In other words, an operand is stored in and directly obtained from a register, and a valid address of the operand is contained in the N groups of initial instructions.

At operation S103, processing the N groups of initial instructions to obtain N groups of source operands and N groups of modification field configuration information.

In this operation, the packet modification apparatus processes the extracted N groups of initial instructions which contain the valid address of the operand, and directly obtain the operand according to the valid address of the operand. The packet modification apparatus processes the N groups of initial instructions to obtain N groups of source operands and N groups of modification field configuration information. The modification field configuration information includes a container number to be correspondingly modified by each initial instruction. Each group of initial instructions corresponds to a group of source operands, a group of modification field configuration information and a container number. The operand, as an entity on which the operator acts, is a component of an expression that specifies an amount of digit arithmetic to be performed in an instruction. The source operand refers to an operand to be processed.

At operation S104, determining, according to the N groups of modification field configuration information, N containers matched with the N groups of source operands, respectively.

In this operation, the modification field configuration information includes a container number to be correspondingly modified by each initial instruction, each of the N groups of initial instructions corresponds to a group of source operands, and the container matched with each group of source operands may be determined according to the modification field configuration information.

At operation S105, modifying, according to the N groups of source operands, the N matched containers, respectively.

In this operation, the packet modification apparatus modifies, according to each of the N groups of source operands, the container matched with the source operands, that is, replaces the content of the field to be modified in the container with the source operands, so as to complete the packet write-back and thus modification of the packet encapsulation information. After the N containers are modified, the N containers may be recombined according to a container division rule to form packet encapsulation information of next hop information of the packet.

It should be noted that when a container is modified, all bits, or a part of bits, of data in the container may be modified.

In an embodiment of the present disclosure, a field to be modified that is related to packet encapsulation information is divided into M containers: a very long instruction word executing a modification command is extracted to obtain N groups of initial instructions (2≤N≤M); and the N groups of initial instructions are processed to obtain N groups of source operands and N groups of modification field configuration information, and according to the N groups of modification field configuration information, N containers matched with the N groups of source operands are respectively determined. Each group of source operands modify a matched container. On the basis of a programmable technology, the N groups of initial instructions are directly addressed without crossing, so that parallel modification is performed on N consecutive containers divided from the field to be modified, and thus modification of the packet encapsulation information is completed. Therefore, a very long instruction word can be executed within one cycle, and compared with serial modification, the use of parallel modification can significantly reduce the operation delay of instructions.

Further, dividing the field to be modified that is related to packet encapsulation information into M containers (i.e., operation S101) includes: dividing the field to be modified into M fields, and configuring each field into a container.

In this operation, the very long instruction word executing the modification command is configured to modify the field to be modified, and the division rule is determined by a microcode corresponding to the very long instruction word. The field to be modified is divided into M fields according to the division rule, where each field is a container, and M containers are divided in total.

In an embodiment of the present disclosure, the packet segmented processing technology is a premise and basis for implementing parallel modification of the field to be modified through a very long instruction word.

Figure 2:
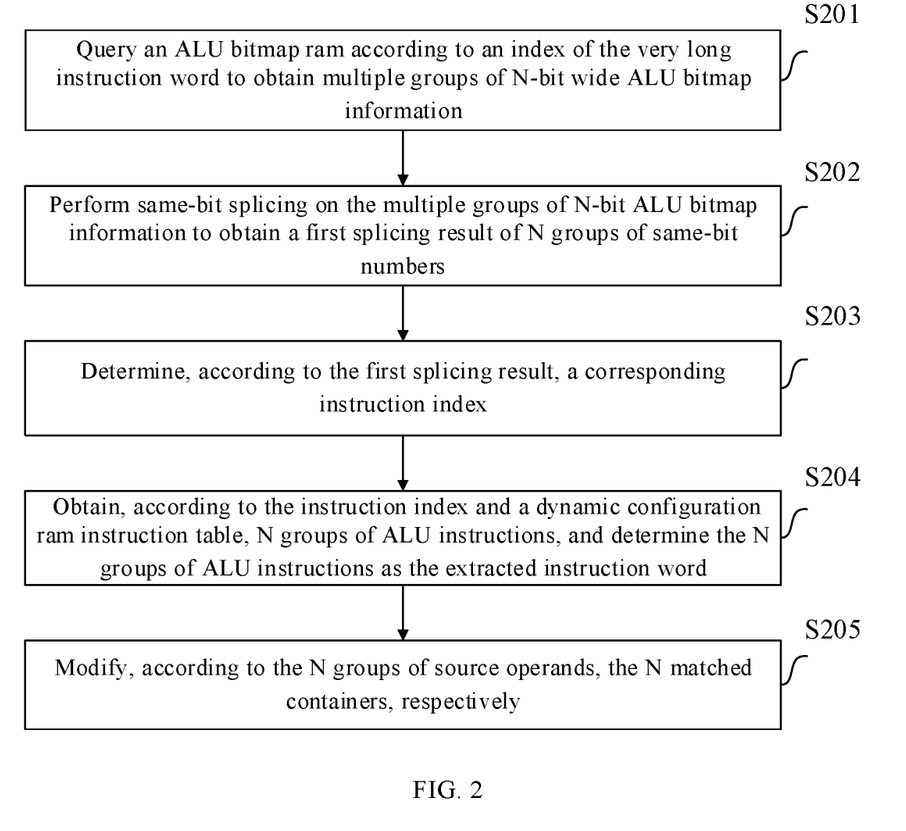
FIG. 2 is another flowchart of a packet modification method according to an embodiment of the present disclosure.

FIG. 2 shows another flowchart of a packet modification method according to an embodiment of the present disclosure. Further, as shown in FIG. 2, the initial instructions include arithmetic logical unit (ALU) instructions, and performing instruction extraction on the very long instruction word executing the modification command, to obtain N groups of initial instructions (i.e., operation S102) includes the following operations S201 to S204.

At operation 201, querying an ALU bitmap ram according to an index of the very long instruction word to obtain multiple groups of N-bit wide ALU bitmap information.

Each element in the bitmap occupies 2 to 32 bits in the memory, and an identifier of the bitmap information in memory may be a column of binary numbers composed of 1 and 0. For example, if each element in the bitmap occupies 8 bits in the memory, it may correspondingly represent 8 decimal numbers. For example, bitmap [0] may represent 0 to 7: bitmap [1] may represent 8 to 15; and bitmap [2] may represent 16 to 23. In bitmap [0], 00000010 represents 1, and 01000000 represents 6.

In this operation, each element in the ALU bitmap ram has a corresponding index, and the packet modification apparatus queries the ALU bitmap ram according to multiple groups of indexes of the very long instruction word to obtain multiple groups of N-bit wide ALU bitmap information, where 2≤N≤32. For example, multiple groups of binary numbers in an 8-bit bitmap may be obtained.

At operation 202, performing same-bit splicing on the multiple groups of N-bit ALU bitmap information to obtain a first splicing result of N groups of same-bit numbers.

In this operation, the packet modification apparatus performs same-bit splicing on the multiple groups of N-bit ALU bitmap information, i.e., connects numbers of one bit in series, to obtain a first splicing result of N groups of same-bit numbers. For example, the multiple groups of N-bit wide ALU bitmap information are all binary numbers in an 8-bit bitmap, and multiple numbers on each bit are spliced in serial to obtain a first splicing result of 8 groups of same-bit numbers. The multiple groups of N-bit wide ALU bitmap information are 00000010, 01000000, 10000000, 00010000 under bitmap [0], and the 8 groups of 4-bit first splicing results are 0010, 0100, 0000, 0001, 0000, 0000, 0100 and 00000. The number of bits of the first splice result should be less than 32 bits.

At operation S203, determining, according to the first splicing result, a corresponding instruction index.

In this operation, each element in the ALU bitmap ram has a corresponding index, the first splicing result may also be found in the bitmap, and the corresponding instruction index is found according to the first splicing result.

At operation S204, obtaining, according to the instruction index and a dynamic configuration ram instruction table, N groups of ALU instructions, and determining the N groups of ALU instructions as the extracted instruction word.

In this operation, the packet modification apparatus searches the ram instruction table item by item according to the N groups of instruction indexes to obtain N groups of ALU instructions, i.e., the extracted instruction word.

In an embodiment of the present disclosure, the field to be modified includes a packet field or a Meta-Frame field. The packet field mainly includes a packet header. The Meta-Frame field refers to a group of data or data structures associated with the Meta-Frame, i.e., a Meta-Frame field, which is a field that applies a same access logic to multiple attributes. In a forwarding chip, the packet field and the Meta-Frame field are both modified and configured to modify packet encapsulation information of next hop information of the packet.

Figure 3:
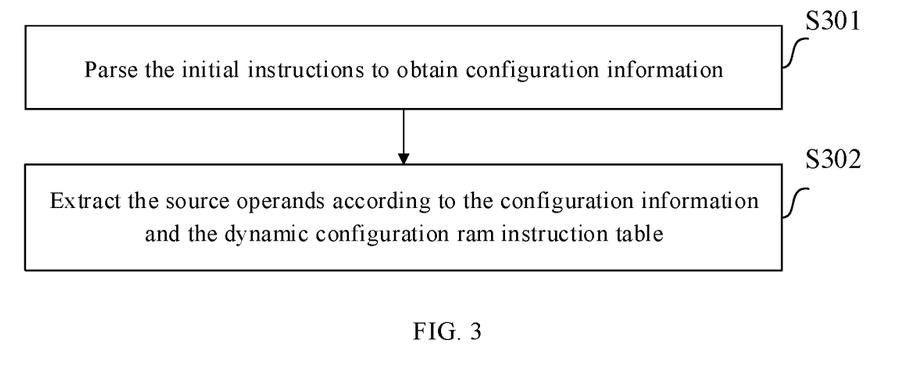
FIG. 3 is another flowchart of a packet modification method according to an embodiment of the present disclosure.

FIG. 3 shows another flowchart of a packet modification method according to an embodiment of the present disclosure. Further, as shown in FIG. 3, the field to be modified includes a packet field, and processing the initial instructions (i.e., operation 103) includes the following operations S301 to S302.

At operation S301, parsing the initial instructions to obtain configuration information.

At operation S302, extracting the source operands according to the configuration information and the dynamic configuration ram instruction table.

In operations 301 to 302, when the field to be modified includes a packet field, the initial instructions are firstly parsed to obtain configuration information, and then a group of corresponding source operands are extracted in combination with the configuration information and the dynamic configuration ram instruction table. The configuration information includes modification field configuration information.

Figure 4:
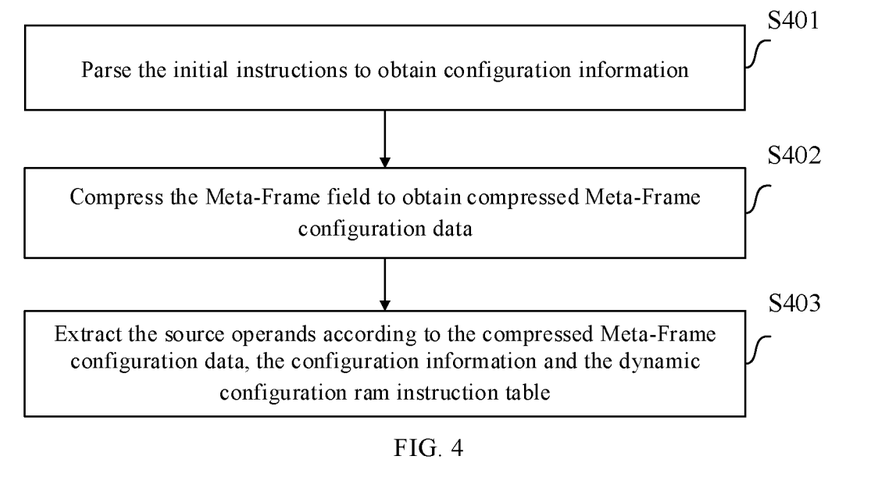
FIG. 4 is another flowchart of a packet modification method according to an embodiment of the present disclosure.

FIG. 4 shows another flowchart of a packet modification method according to an embodiment of the present disclosure. Further, as shown in FIG. 4, the field to be modified includes a Meta-Frame field, and processing the initial instructions (i.e., operation S103) further includes the following operations S401 to S403.

At operation S401, parsing the initial instructions to obtain configuration information.

At operation S402, compressing the Meta-Frame field to obtain compressed Meta-Frame configuration data.

At operation S403, extracting the source operands according to the compressed Meta-Frame configuration data, the configuration information and the dynamic configuration ram instruction table.

In operations S401 to S403, when the field to be modified includes a Meta-Frame field, the initial instructions are firstly parsed to obtain configuration information, and then the Meta-Frame field is compressed to obtain the compressed Meta-Frame configuration data, and finally a group of corresponding source operands are extracted in combination with the configuration information, the compressed Meta-Frame configuration data, and the dynamic configuration ram instruction table. The configuration information includes modification field configuration information.

Further, parsing the initial instructions to obtain the configuration information (i.e., operation S301 or S401) includes:

parsing the initial instructions according to a microcode configuration rule to obtain callback function action source operand configuration information, immediate source operand configuration information, Meta-Frame source operand configuration information, instruction type configuration information, and modification field configuration information.

In this operation, the packet modification apparatus parses the extracted N groups of initial instructions according to a microcode configuration rule, that is, decodes, intercepts corresponding fields, and intercepts N groups of configuration information. The N groups of configuration information include N groups of callback function action source operand configuration information, N groups of immediate source operand configuration information, N groups of Meta-Frame source operand configuration information, N groups of instruction type configuration information, and N groups of modification field configuration information.

Further, extracting the source operands according to the configuration information and the dynamic configuration ram instruction table (i.e., operation S302) includes: querying action configuration data and immediate configuration data in the dynamic configuration ram instruction table: computing the action configuration data and the action source operand configuration information to extract an action source operand, and computing the immediate configuration data and the immediate source operand configuration information to extract an immediate source operand; and processing, according to the instruction type configuration parameters, the action source operand and N groups of immediate source operands, to extract the source operands.

In this operation, the packet modification apparatus computes according to the N groups of action source operand configuration information and the N groups of immediate source operand configuration information in the configuration information, in combination with the action configuration data and the immediate configuration data in the dynamic configuration ram instruction table, to extract two types of N groups of source operands in parallel.

Further, extracting the source operands according to the compressed Meta-Frame configuration data, the configuration information and the dynamic configuration ram instruction table (i.e., operation S403) includes: querying action configuration data and immediate configuration data in the dynamic configuration ram instruction table; computing the action configuration data and the action source operand configuration information to extract an action source operand, and computing the compressed Meta-Frame configuration data and the Meta-Frame source operand configuration information to extract an Meta-Frame source operand, and computing the immediate configuration data and the immediate source operand configuration information to extract an immediate source operand; and processing, according to the instruction type configuration parameters, the action source operand, the Meta-Frame source operand, and the immediate source operand, to extract the source operands.

In this operation, the packet modification apparatus computes according to the N groups of callback function action source operand configuration information, the N groups of Meta-Frame source operand configuration information, and the N groups of immediate source operand configuration information in the configuration information, in combination with the action configuration data, the compressed Meta-Frame configuration data, and the immediate configuration data in the dynamic configuration ram instruction table, to extract three types of N groups of source operands in parallel.

At this point, N groups of initial instructions of two fields to be modified can both obtain a group of source operands parsed by each group of initial instructions, and each group of source operands may be configured to modify a container matched with a corresponding group of initial instructions. The container can be modified merely when the number of bits of each group of source operands is less than the maximum number of bits that the modified container supports to modify. Since 2≤N≤32, a maximum of 32 containers can be modified in the embodiment of the present disclosure.

In an embodiment of the present disclosure, a programmable technology is adopted so that various instruction types can be supported, and the configuration is more flexible. The instruction may be dynamically configured based on a plurality of entries, so that a corresponding field can be modified in a programmable manner; and a variety of different instruction types are supported.

Figure 5:
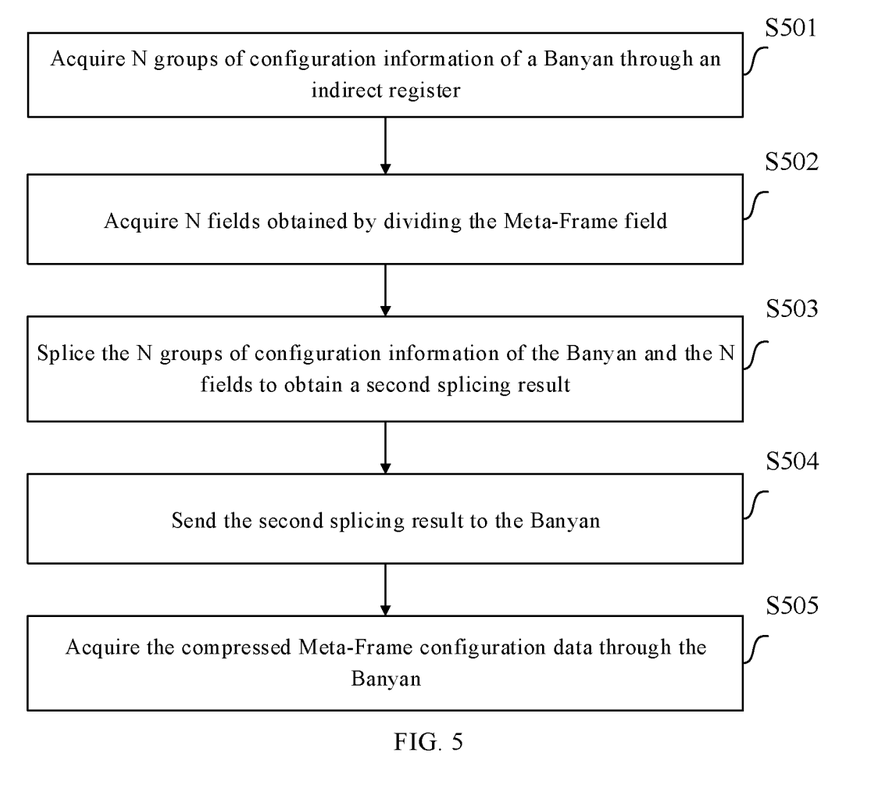
FIG. 5 is another flowchart of a packet modification method according to an embodiment of the present disclosure.

FIG. 5 shows another flowchart of a packet modification method according to an embodiment of the present disclosure. Further, as shown in FIG. 5, compressing the Meta-Frame field to obtain the compressed Meta-Frame configuration data (i.e., operation S402) includes the following operations S501 to S505.

At operation S501, acquiring N groups of configuration information of a Banyan through an indirect register.

At operation S502, acquiring N fields obtained by dividing the Meta-Frame field.

At operation S503, splicing the N groups of configuration information of the Banyan and the N fields to obtain a second splicing result.

At operation S504, sending the second splicing result to the Banyan.

In operations S501 to S504, an ingress of the Banyan is statically configured. By acquiring N groups of configuration information of the Banyan through an indirect register and splicing the N fields obtained by dividing the Meta-Frame field, a second splicing result is obtained. The second splicing result is spliced as ingress data to the ingress of the Banyan.

At operation S505, acquiring the compressed Meta-Frame configuration data through the Banyan.

In this operation, the Banyan network has a unique path characteristic, which means that there is a passage between any incoming line and any outgoing line. The compressed Meta-Frame configuration data is acquired through the Banyan.

Further, acquiring the compressed Meta-Frame configuration data through the Banyan (i.e., operation S505) includes:
taking out partial data returned from the Banyan in a sequence from lower to higher bits; and splicing the partial data to obtain compressed Meta-Frame configuration data. The packet modification apparatus takes out partial data at an egress of the Banyan in a sequence from lower to higher bits, and splices the partial data to obtain the compressed Meta-Frame configuration data, and complete compression of the Meta-Frame.

In an embodiment of the present disclosure, the compressed Meta-Frame configuration data is used as an extraction source of source operands, so that the complexity and resource amount involved in source operand extraction are greatly reduced compared with the original Meta-Frame.

Figure 6:
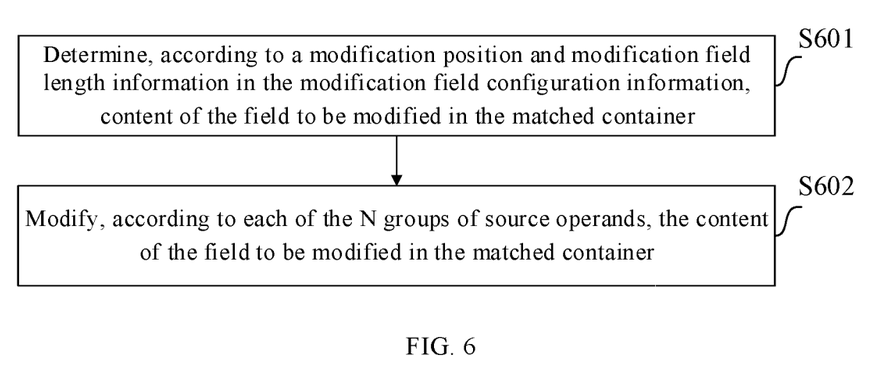
FIG. 6 is another flowchart of a packet modification method according to an embodiment of the present disclosure.

FIG. 6 shows another flowchart of a packet modification method according to an embodiment of the present disclosure. Further, as shown in FIG. 6, modifying, according to the N groups of source operands, the N matched containers (i.e., operation S105), respectively includes the following operations S601 to S602.

At operation S601, determining, according to a modification position and modification field length information in the modification field configuration information, content of the field to be modified in the matched container.

In this operation, the containers divided from the field to be modified support to modify any one of the following maximum numbers of bits: 8 bits, 16 bits, or 32 bits, and all bits, or some bits, of the containers can be modified. According to a modification position and modification field length information in the modification field configuration information, content of the field to be modified in the matched container is determined. The content of the field to be modified may include all bits, or some bits, of the container.

At operation S602, modifying, according to each of the N groups of source operands, the content of the field to be modified in the matched container.

In this operation, the corresponding container can be modified merely when the number of bits of each group of source operands is less than the maximum number of bits that the matched container supports to modify. According to each of the N groups of source operands, content of the field to be modified in the matched container are respectively modified to complete modification of the N containers in parallel.

Figure 7:
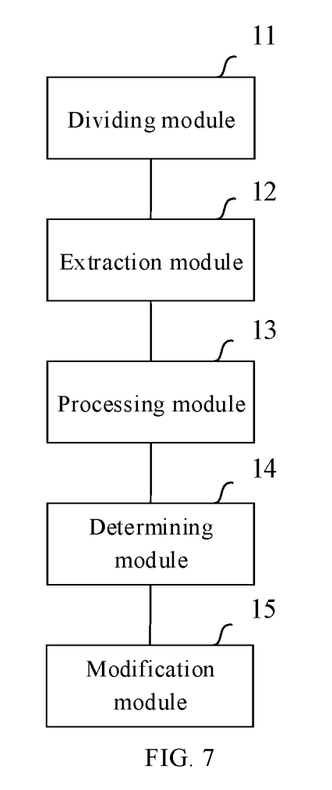
FIG. 7 is a block diagram of a packet modification apparatus according to an embodiment of the present disclosure.

FIG. 7 shows a schematic structural diagram of a packet modification apparatus according to an embodiment of the present disclosure. Based on a same technical concept as the embodiment corresponding to FIG. 1, as shown in FIG. 7, the packet modification apparatus according to the embodiment of the present disclosure includes: a dividing module 11, an extraction module 12, a processing module 13, a determining module 14, and a modification module 15.

The dividing module 11 is configured to divide a field to be modified that is related to packet encapsulation information into M containers.

The extraction module 12 is configured to perform instruction extraction on a very long instruction word executing a modification command, to obtain N groups of initial instructions, where 2≤N≤M.

The processing unit 13 is configured to process the N groups of initial instructions to obtain N groups of source operands and N groups of modification field configuration information.

The determining module 14 is configured to determine, according to the N groups of modification field configuration information, N containers matched with the N groups of source operands, respectively.

The modification module 15 is configured to modify, according to the N groups of source operands, the N matched containers, respectively.

In some embodiments, the dividing module 11 may be specifically configured to: divide the field to be modified into M fields, and configure each field into a container.

In some embodiments, the initial instructions include arithmetic logical unit (ALU) instructions, and the extraction module 12 may be specifically configured to: query an ALU bitmap ram according to an index of the very long instruction word to obtain multiple groups of N-bit wide ALU bitmap information; perform same-bit splicing on the multiple groups of N-bit ALU bitmap information to obtain a first splicing result of N groups of same-bit numbers; determine, according to the first splicing result, a corresponding instruction index; and obtain, according to the instruction index and a dynamic configuration ram instruction table, N groups of ALU instructions, and determine the N groups of ALU instructions as the extracted instruction word.

In some embodiments, the field to be modified includes a packet field, the processing unit 13 may be specifically configured to: parse the initial instructions to obtain configuration information, where the configuration information includes modification field configuration information; and extract the source operands according to the configuration information and the dynamic configuration ram instruction table.

In some embodiments, the field to be modified includes a Meta-Frame field, and the processing unit 13 may be specifically configured to: parse the initial instructions to obtain configuration information, where the configuration information includes modification field configuration information: compress the Meta-Frame field to obtain compressed Meta-Frame configuration data; and extract the source operands according to the compressed Meta-Frame configuration data, the configuration information and the dynamic configuration ram instruction table.

In some embodiments, the processing unit 13 may be specifically configured to: parse the initial instructions according to a microcode configuration rule to obtain callback function action source operand configuration information, immediate source operand configuration information, Meta-Frame source operand configuration information, instruction type configuration information, and modification field configuration information.

In some embodiments, the processing unit 13 may be specifically configured to: query action configuration data and immediate configuration data in the dynamic configuration ram instruction table: compute the action configuration data and the action source operand configuration information to extract an action source operand, and compute the immediate configuration data and the immediate source operand configuration information to extract an immediate source operand; and process, according to the instruction type configuration parameters, the action source operand and N groups of immediate source operands, to extract the source operands.

In some embodiments, the processing unit 13 may be specifically configured to: query action configuration data and immediate configuration data in the dynamic configuration ram instruction table: compute the action configuration data and the action source operand configuration information to extract an action source operand, and compute the compressed Meta-Frame configuration data and the Meta-Frame source operand configuration information to extract an Meta-Frame source operand, and compute the immediate configuration data and the immediate source operand configuration information to extract an immediate source operand; and process, according to the instruction type configuration parameters, the action source operand, the Meta-Frame source operand, and the immediate source operand, to extract the source operands.

In some embodiments, the processing unit 13 may be specifically configured to: acquire N groups of configuration information of a space division switching network Banyan through an indirect register: acquire N fields obtained by dividing the Meta-Frame field: splice the N groups of configuration information of the Banyan and the N fields to obtain a second splicing result: send the second splicing result to the Banyan; and acquire the compressed Meta-Frame configuration data through the Banyan.

In some embodiments, the processing unit 13 may be specifically configured to: take out partial data returned from the Banyan in a sequence from lower to higher bits; splice the partial data to obtain the compressed Meta-Frame configuration data.

In some embodiments, the modification module 14 may be specifically configured to: determine, according to a modification position and modification field length information in the modification field configuration information, content of the field to be modified in the matched container; and modify, according to each of the N groups of source operands, the content of the field to be modified in the matched container. The number of bits of each group of source operands is less than the maximum number of bits that the matched container supports to modify.

An embodiment of the present disclosure further provides a computer device, including: one or more processors, and a storage means. The storage means stores one or more programs thereon which, when executed by the one or more processors, cause the one or more processors to perform the packet modification method as described in any of the above embodiments.

An embodiment of the present disclosure further provides a computer readable storage medium storing a computer program thereon which, when executed, causes the packet modification method as described in any of the above embodiments to be implemented.

Those of ordinary skill in the art will appreciate that all or some operations of the above described method, functional modules/units in the apparatus may be implemented as software, firmware, hardware, and suitable combinations thereof. In a hardware implementation, the division between the functional modules/units mentioned in the above description does not necessarily correspond to the division of physical components: for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer readable medium which may include a computer storage medium (or non-transitory medium) and communication medium (or transitory medium). The term computer storage medium includes volatile and nonvolatile, removable and non-removable media implemented in any method or technology for storage of information such as computer readable instructions, data structures, program modules or other data, as is well known to those of ordinary skill in the art. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed example embodiments, and although specific terms are employed, they are used and should be interpreted merely in a generic and descriptive sense, not for purposes of limitation. In some instances, as would be apparent to one skilled in the art, features, characteristics and/or elements described in connection with a particular embodiment may be used alone or in combination with features, characteristics and/or elements described in connection with another embodiment, unless expressly stated otherwise. It will, therefore, be understood by those skilled in the art that various changes in form and details may be made therein without departing from the scope of the present disclosure as set forth in the appended claims.

What is claimed is:

1. A packet modification method, comprising:
   dividing a field to be modified that is related to packet encapsulation information into M containers;

performing instruction extraction on a very long instruction word executing a modification command, to obtain N groups of initial instructions, where 2≤N≤M;

processing the N groups of initial instructions to obtain N groups of source operands and N groups of modification field configuration information;

determining, according to the N groups of modification field configuration information, N containers matched with the N groups of source operands, respectively; and modifying, according to the N groups of source operands, the N matched containers, respectively.

2. The method according to claim 1, wherein dividing the field to be modified that is related to packet encapsulation information into M containers comprises:

dividing the field to be modified into M fields, and configuring each field into a container.

3. The method according to claim 1, wherein the initial instructions comprise arithmetic logical unit (ALU) instructions, and wherein performing instruction extraction on the very long instruction word executing the modification command, to obtain N groups of initial instructions comprises:

querying an ALU bitmap random access memory (ram) according to an index of the very long instruction word to obtain multiple groups of N-bit wide ALU bitmap information;

performing same-bit splicing on the multiple groups of N-bit ALU bitmap information to obtain a first splicing result of N groups of same-bit numbers;

determining, according to the first splicing result, a corresponding instruction index; and obtaining, according to the instruction index and a dynamic configuration ram instruction table, N groups of ALU instructions.

4. The method according to claim 1, wherein the field to be modified comprises a packet field, and wherein processing the initial instructions comprises:

parsing the initial instructions to obtain configuration information including modification field configuration information; and extracting the source operands according to the configuration information and the dynamic configuration ram instruction table.

5. The method according to claim 1, wherein the field to be modified comprises a Meta-Frame field, and wherein processing the initial instructions further comprises:

parsing the initial instructions to obtain configuration information including modification field configuration information;

compressing the Meta-Frame field to obtain compressed Meta-Frame configuration data; and extracting the source operands according to the compressed Meta-Frame configuration data, the configuration information and the dynamic configuration ram instruction table.

6. The method according to claim 4, wherein parsing the initial instructions to obtain the configuration information comprises:

parsing the initial instructions according to a microcode configuration rule to obtain callback function action source operand configuration information, immediate source operand configuration information, Meta-Frame source operand configuration information, instruction type configuration information, and modification field configuration information.

7. The method according to claim 6, wherein extracting the source operands according to the configuration information and the dynamic configuration ram instruction table comprises:

querying action configuration data and immediate configuration data in the dynamic configuration ram instruction table;

computing the action configuration data and the action source operand configuration information to extract an action source operand, and computing the immediate configuration data and the immediate source operand configuration information to extract an immediate source operand; and processing, according to the instruction type configuration parameters, the action source operand and N groups of immediate source operands, to extract the source operands.

8. The method according to claim 6, wherein extracting the source operands according to the compressed Meta-Frame configuration data, the configuration information and the dynamic configuration ram instruction table comprises:

querying action configuration data and immediate configuration data in the dynamic configuration ram instruction table;

computing the action configuration data and the action source operand configuration information to extract an action source operand, and computing the compressed Meta-Frame configuration data and the Meta-Frame source operand configuration information to extract a Meta-Frame source operand, and computing the immediate configuration data and the immediate source operand configuration information to extract an immediate source operand; and processing, according to the instruction type configuration parameters, the action source operand, the Meta-Frame source operand, and the immediate source operand, to extract the source operands.

9. The method according to claim 5, wherein compressing the Meta-Frame field to obtain the compressed Meta-Frame configuration data comprises:

acquiring N groups of configuration information of a space division switching network Banyan through an indirect register;

acquiring N fields obtained by dividing the Meta-Frame field;

splicing the N groups of configuration information of the Banyan and the N fields to obtain a second splicing result;

sending the second splicing result to the Banyan; and acquiring the compressed Meta-Frame configuration data through the Banyan.

10. The method according to claim 9, wherein acquiring the compressed Meta-Frame configuration data through the Banyan comprises:

taking out partial data returned from the Banyan in a sequence from lower to higher bits; and splicing the partial data to obtain the compressed Meta-Frame configuration data.

11. The method according to claim 1, wherein respectively modifying, according to the N groups of source operands, the N matched containers comprises:

determining, according to a modification position and modification field length information in the modification field configuration information, content of the field to be modified in the matched container; and modifying, according to each of the N groups of source operands, content of the field to be modified in the matched container, respectively, wherein a bit number of each group of source operands is less than a maximum modified bit number supported by the matched container.

12. A packet modification apparatus, comprising:
a dividing module configured to divide a field to be modified that is related to packet encapsulation information into M containers;
an extraction module configured to perform instruction extraction on a very long instruction word executing a modification command, to obtain N groups of initial instructions, where 2≤N≤M;
a processing module configured to process the N groups of initial instructions to obtain N groups of source operands and N groups of modification field configuration information;
a determining module configured to determine, according to the N groups of modification field configuration information, N containers matched with the N groups of source operands, respectively; and
a modification module configured to modify, according to the N groups of source operands, the N matched containers, respectively.

13. A computer device, comprising:
one or more processors; and
a storage means having one or more programs stored thereon which,
when executed by the one or more processors, cause the one or more processors to perform the packet modification method according to claim 1.

14. A computer readable storage medium having a computer program stored thereon which, when executed, causes the packet modification method according to claim 1 to be implemented.

15. The method according to claim 5, wherein parsing the initial instructions to obtain the configuration information comprises:
parsing the initial instructions according to a microcode configuration rule to obtain callback function action source operand configuration information, immediate source operand configuration information, Meta-Frame source operand configuration information, instruction type configuration information, and modification field configuration information.

16. The method according to claim 15, wherein extracting the source operands according to the configuration information and the dynamic configuration ram instruction table comprises:
querying action configuration data and immediate configuration data in the dynamic configuration ram instruction table;
computing the action configuration data and the action source operand configuration information to extract an action source operand, and computing the immediate configuration data and the immediate source operand configuration information to extract an immediate source operand; and
processing, according to the instruction type configuration parameters, the action source operand and N groups of immediate source operands, to extract the source operands.

17. The method according to claim 15, wherein extracting the source operands according to the compressed Meta-Frame configuration data, the configuration information and the dynamic configuration ram instruction table comprises:
querying action configuration data and immediate configuration data in the dynamic configuration ram instruction table;
computing the action configuration data and the action source operand configuration information to extract an action source operand, and computing the compressed Meta-Frame configuration data and the Meta-Frame source operand configuration information to extract a Meta-Frame source operand, and computing the immediate configuration data and the immediate source operand configuration information to extract an immediate source operand; and
processing, according to the instruction type configuration parameters, the action source operand, the Meta-Frame source operand, and the immediate source operand, to extract the source operands.

* * * * *